United States Patent
Eilat et al.

(10) Patent No.: US 12,272,103 B2
(45) Date of Patent: Apr. 8, 2025

(54) MATCHING OBJECTS IN IMAGES

(71) Applicant: Percepto Robotics Ltd, Modiln (IL)

(72) Inventors: Eran Eilat, Beit-SheAn (IL); Yekutiel Katz, Omer (IL); Ovadya Menadeva, Modiln (IL)

(73) Assignee: Percepto Robotics Ltd, Modiln (IL)

( * ) Notice: Subject to any disclaimer, the term of this patent is extended or adjusted under 35 U.S.C. 154(b) by 405 days.

(21) Appl. No.: 17/706,691

(22) Filed: Mar. 29, 2022

(65) Prior Publication Data
US 2023/0316574 A1    Oct. 5, 2023

(51) Int. Cl.
G06T 7/80    (2017.01)
G06T 7/38    (2017.01)
G06T 7/73    (2017.01)

(52) U.S. Cl.
CPC .......... G06T 7/85 (2017.01); G06T 7/38 (2017.01); G06T 7/73 (2017.01)

(58) Field of Classification Search
CPC .... G06T 7/73; G06T 7/38; G06T 7/85; G06T 2207/10036; G06T 2207/10048; G06T 2207/30184; G06T 7/33
See application file for complete search history.

(56) References Cited

U.S. PATENT DOCUMENTS

| | | | | |
|---|---|---|---|---|
| 10,390,003 | B1 * | 8/2019 | Liu | G01C 21/206 |
| 2021/0148707 | A1 * | 5/2021 | Kawabayashi | G01C 21/3602 |
| 2022/0066456 | A1 * | 3/2022 | Ebrahimi Afrouzi | G06F 3/04883 |
| 2022/0284609 | A1 * | 9/2022 | Shree | G06T 7/33 |
| 2023/0206584 | A1 * | 6/2023 | Jin | G06V 20/17 382/103 |
| 2025/0005822 | A1 * | 1/2025 | Xuan | G06F 16/535 |

OTHER PUBLICATIONS

Yoshifumi Kitamura et al., "Trinocular vision using edge continuity and local features",, Systems and Computers in Japan, vol. 19, No. 12 (Year: 1988).*
User: "Tübingen Machine Learning"), "Computer Vision—Lecture 3.4 (Structure-from-Motion: Bundle Adjustment)", (Date: Apr. 25, 2021), YouTube (Year: 2021).*

* cited by examiner

Primary Examiner — Ming Y Hon

(57) ABSTRACT

There is provided a method of matching features depicted in images, comprising: detecting a first object depicted in a first image, projecting a first epipolar line, from the first object of the first image, to a second image, selecting second objects along the first epipolar line of the second image, projecting second epipolar lines, from the second objects of the second image, to a third image, projecting a third epipolar line from the first object of the first image to the third image, identifying on the third image, a third object along an intersection of the third epipolar line and a certain second epipolar line of the second epipolar lines, and generating an indication of the first object depicted in first image and the third object depicted in the third image as matches of a same physical object.

16 Claims, 10 Drawing Sheets

MATCHING OBJECTS IN IMAGES

FIELD AND BACKGROUND OF THE INVENTION

The present invention, in some embodiments thereof, relates to image processing and, more specifically, but not exclusively, to matching objects depicted in multiple images.

Feature matching is an important task for many machine vision applications. Features are identified in different images, and the same feature depicted in the different images is identified.

SUMMARY OF THE INVENTION

According to a first aspect, a computer implemented method of matching features depicted in a plurality of images, comprises: detecting a first object depicted in a first image, projecting a first epipolar line, from the first object of the first image, to a second image, selecting a plurality of second objects along the first epipolar line of the second image, projecting a plurality of second epipolar lines, from the plurality of second objects of the second image, to a third image, projecting a third epipolar line from the first object of the first image to the third image, identifying on the third image, a third object along an intersection of the third epipolar line and a certain second epipolar line of the plurality of second epipolar lines, and generating an indication of the first object depicted in first image and the third object depicted in the third image as matches of a same physical object.

According to a second aspect, a system for matching features depicted in a plurality of images, comprises: at least one processor executing a code for: detecting a first object depicted in a first image, projecting a first epipolar line, from the first object of the first image, to a second image, selecting a plurality of second objects along the first epipolar line of the second image, projecting a plurality of second epipolar lines, from the plurality of second objects of the second image, to a third image, projecting a third epipolar line from the first object of the first image to the third image, identifying on the third image, a third object along an intersection of the third epipolar line and a certain second epipolar line of the plurality of second epipolar lines, and generating an indication of the first object depicted in first image and the third object depicted in the third image as matches of a same physical object.

According to a third aspect, a non-transitory medium storing program instructions for matching features depicted in a plurality of images, which, when executed by at least one processor, cause the at least one processor to: detect a first object depicted in a first image, project a first epipolar line, from the first object of the first image, to a second image, select a plurality of second objects along the first epipolar line of the second image, project a plurality of second epipolar lines, from the plurality of second objects of the second image, to a third image, project a third epipolar line from the first object of the first image to the third image, identify on the third image, a third object along an intersection of the third epipolar line and a certain second epipolar line of the plurality of second epipolar lines, and generate an indication of the first object depicted in first image and the third object depicted in the third image as matches of a same physical object.

In a further implementation form of the first, second, and third aspects, in response to identifying a plurality of third objects on the third image, further comprising: obtaining a fourth image of the plurality of images, projecting a first epipolar line, from the first object of the first image, to the fourth image, selecting a plurality of second objects along the first epipolar line of the fourth image, projecting a plurality of second epipolar lines, from the plurality of second objects of the fourth image, to the third image, wherein the third object is identified on the third image, and the indication is generated for the first, second, third, and fourth images.

In a further implementation form of the first, second, and third aspects, in response to identifying a plurality of third objects on the third image, further comprising iterating the obtaining, the projecting the first epipolar line, the selecting, and the projecting the plurality of second epipolar lines, using sequentially obtained new images until a single third object is identified.

In a further implementation form of the first, second, and third aspects, the first image overlaps the second image and the third image, the second image overlaps the first image and the third image, and the third image overlaps the first image and the second image.

In a further implementation form of the first, second, and third aspects, further comprising mapping the certain second epipolar line of the third image, to a corresponding fourth object of the second image, wherein the fourth object depicted in the second image is the same as the first object depicted in the first image and the third object depicted in the third image.

In a further implementation form of the first, second, and third aspects, generating the indication further comprises generating the indication of the fourth object depicted in the second image as the same physical object as the first object depicted in the first image and the third object depicted in the third image.

In a further implementation form of the first, second, and third aspects, the fourth object lies along the first epipolar line depicted in the second image.

In a further implementation form of the first, second, and third aspects, the fourth object is one of the plurality of second objects along the first epipolar line of the second image.

In a further implementation form of the first, second, and third aspects, further comprising feeding the indication of the first object depicted in first image and the third object depicted in the third image to an image processing process that processes images based on matching features identified in a plurality of images.

In a further implementation form of the first, second, and third aspects, the image processing process is selected from a group comprising: homography, stereoscopic vision, epipolar related search, 3D reconstruction, and orthophoto creation.

In a further implementation form of the first, second, and third aspects, the first image, the second image, and the third image depict a plurality of objects that are similar looking to the first object and the third object.

In a further implementation form of the first, second, and third aspects, the plurality of similar looking objects are at least one of: in near proximity to each other, and arranged in a repeating pattern.

In a further implementation form of the first, second, and third aspects, further comprising accessing parameters of at least one imaging sensor that captured the plurality of images, wherein the epipolar lines are computed according to the parameters, wherein the parameters include at least one of: position of the at least one imaging sensor, orientation of the at least one imaging sensor, and intrinsic parameters of the at least one imaging sensor.

In a further implementation form of the first, second, and third aspects, the parameters are at least one of computed and refined using a bundle adjustment process.

In a further implementation form of the first, second, and third aspects, detecting the first object comprises detecting a plurality of first objects depicted in the first image, wherein the projecting the first epipolar line, the selecting the plurality of second objects, the projecting the plurality of second epipolar lines, the projecting the third epipolar line, the identifying on the third image, and the generating the indication, are iterated for each one of the plurality of first objects.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
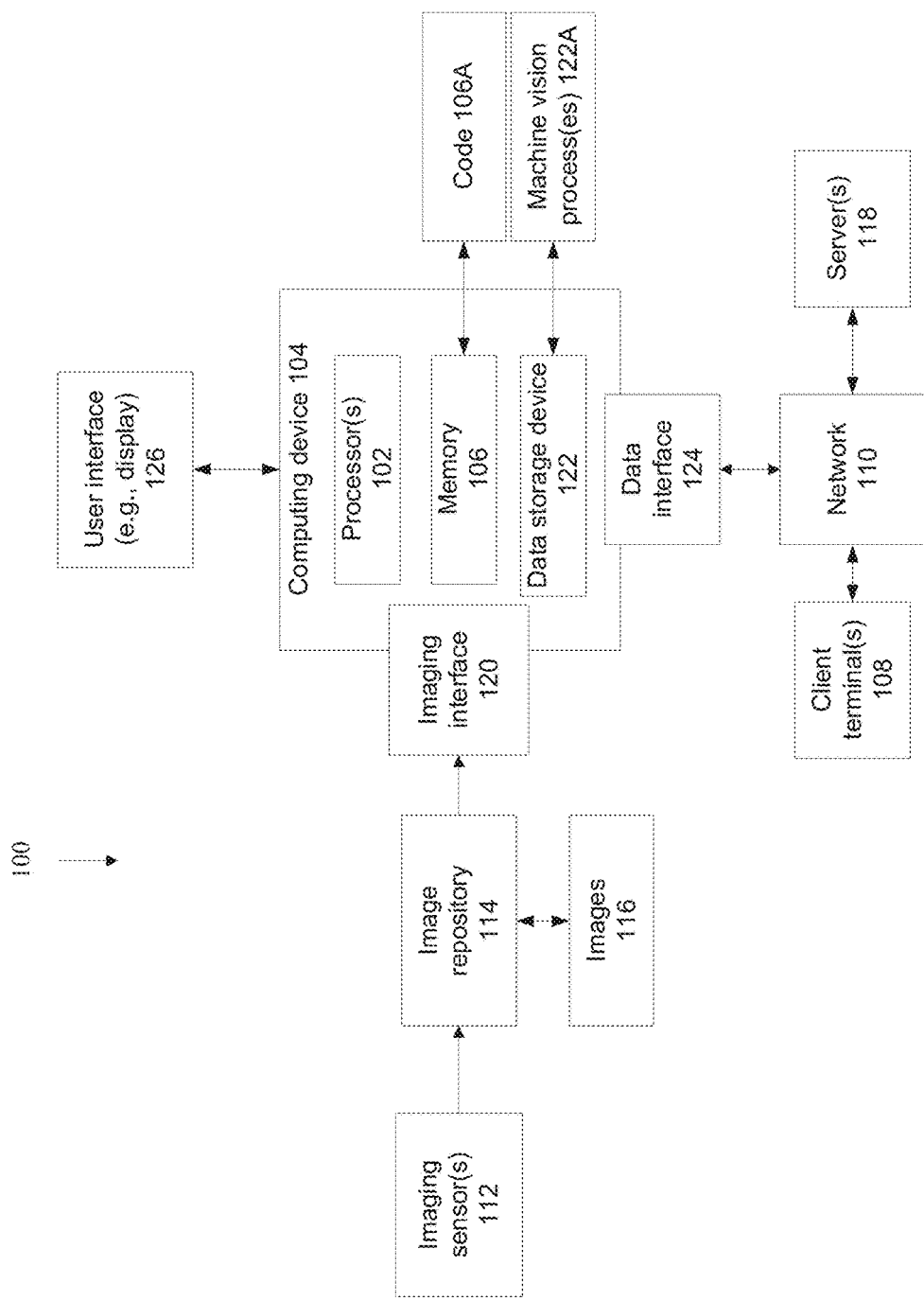
FIG. 1 is a block diagram of components of a system for matching objects depicted in different images based on triangulation, in accordance with some embodiments of the present invention.

The present invention, in some embodiments thereof, relates to image processing and, more specifically, but not exclusively, to matching objects depicted in multiple images.

An aspect of some embodiments of the present invention relates to systems, methods, a device, and/or code instructions (e.g., stored on a data storage device such as a memory and executable by one or more processors) for matching features in multiple overlapping images, where the matched features may represent the same real world object, based on triangulation of the world object using epipolar lines. A first object is selected from a first image of multiple images (referred to herein as first, second, and third image, for clarity). A first epipolar line is projected from the first object of the first image, to a second image. Multiple second objects along the first epipolar line of the second image are identified (e.g., selected). Multiple second epipolar lines are projected from the second objects of the second image, to a third image. A third epipolar line is projected from the first object of the first image to the third image. On the third image, a third object is identified along an intersection of the third epipolar line and a certain second epipolar line of the multiple second epipolar lines. Optionally, such as when there are multiple third identified objects, the processor maps the certain second epipolar line of the third image, to a corresponding fourth object on the second image. The fourth object lies along the first epipolar line depicted in the second image. An indication of one or more of the following objects depicted in images, as being matches of the same object (i.e., the same physical object in the real world) is generated: the first object depicted in first image, the fourth object depicted in the second image, and the third object depicted in the third image. The indication of the same object depicted in the multiple overlapping images may be fed, for example, into a machine vision process designed to process images based on matching features.

As used herein, the phrases matching features and matching objects may be used interchangeably. For example, features of the object may be matched, which indicates matching of the object.

At least some implementations of the systems, methods, devices, and/or code instructions (e.g., stored on a data storage device such as a memory and executable by processor(s)) described herein improve the technical field of machine vision, in particular, the technology of matching features depicted in different images. Feature matching is an important task for machine vision application, for example, to perform homography, stereoscopic vision, epipolar related search, 3d reconstruction, orthophoto creation among other tasks.

At least some implementations of the systems, methods, devices, and/or code instructions (e.g., stored on a data storage device such as a memory and executable by processor(s)) described herein improve upon prior and/or existing approaches of feature matching, for example, SIFT (Scale-Invariant Feature Transform), SURF (Speeded-up Robust Features), Harris Corner, and others.

At least some implementations of the systems, methods, devices, and/or code instructions (e.g., stored on a data storage device such as a memory and executable by processor(s)) described herein address the technical problem of matching objects, optionally features of the objects, depicting in multiple overlapping images. The images may be captured by the same imaging sensor and/or by different imaging sensors, at different positions and/or orientations. The match may be performed based on a defined computer vision based metric that indicates whether a feature in one image matches a feature in another image. The technical problem is that in image depicting multiple objects, which appear similar to one another, and/or which may be densely distributed, it is difficult to tell which object in one image matches which object in another image. Since one object in a first image appears similar to multiple (optionally many) other objects in a second image, the object scores a high value on the matching metric with each of the multiple other objects in the second image. As such, existing computer vision feature matching processes cannot accurately determine which of the multiple objects in the second image is the real match to the object in the first image. Existing computer vision feature matching processes cannot be used to match multiple objects in images where the multiple objects appear similar to one another, and/or are densely distributed. Examples of such objects depicted in images that cannot be matched by existing computer visions feature matching processes include solar panel crossarms, solar farms, crops, pipelines, trees (e.g., forest), and objects arranged in a grid (e.g., infrastructure).

In at least some embodiments, the improvement to the technical field, the improvement over prior and/or existing approaches, and/or the solution to the technical problem, is based on triangulation, by computing and projecting epipolar lines between the different images. The triangular based approach accurately matches different instances of the same object depicted in different images, even in images depicting multiple similar looking objects, which may be densely distributed in the image.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
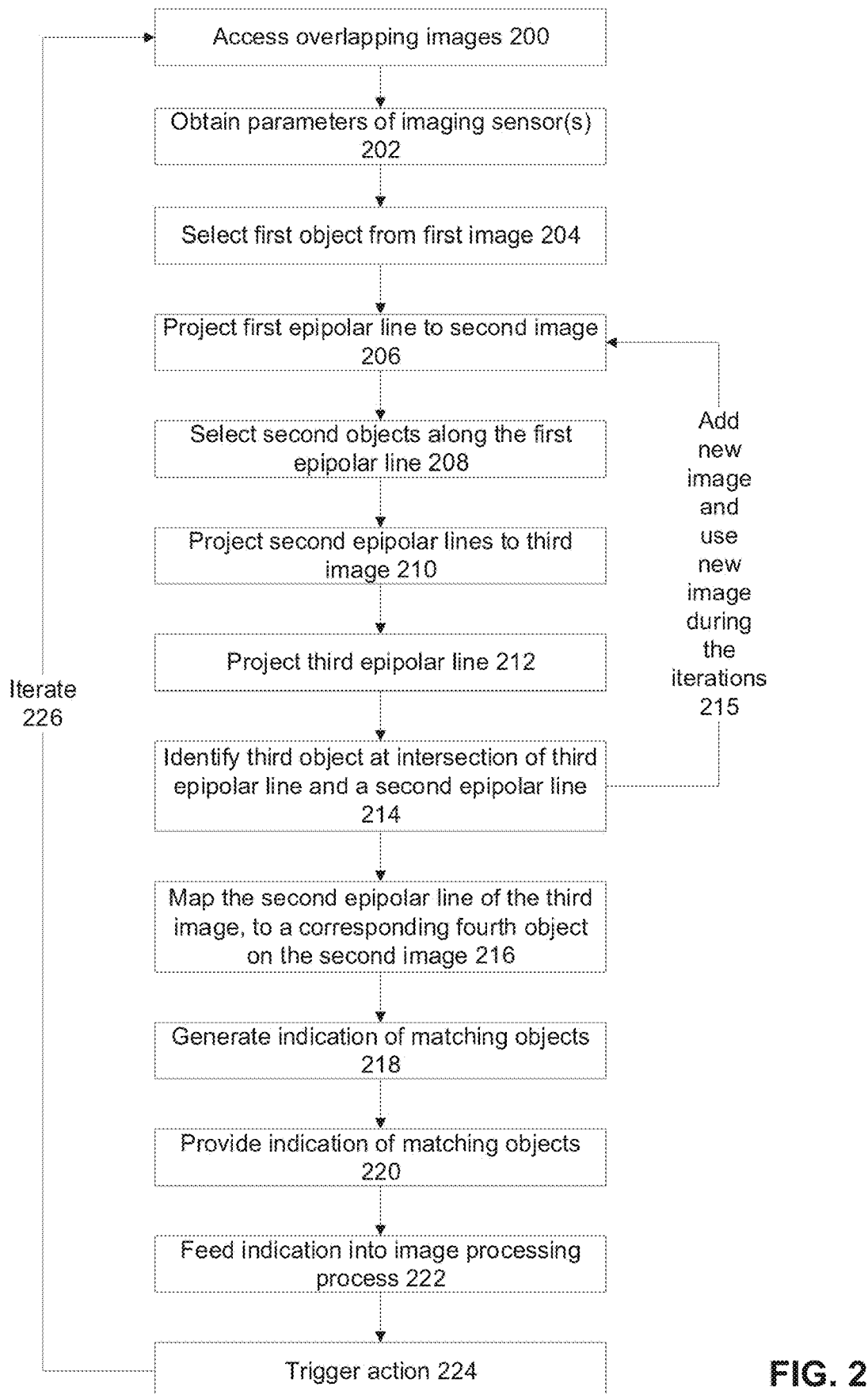
FIG. 2 is a flowchart of a method of matching objects depicted in different images based on triangulation, in accordance with some embodiments of the present invention.
Figure 3:
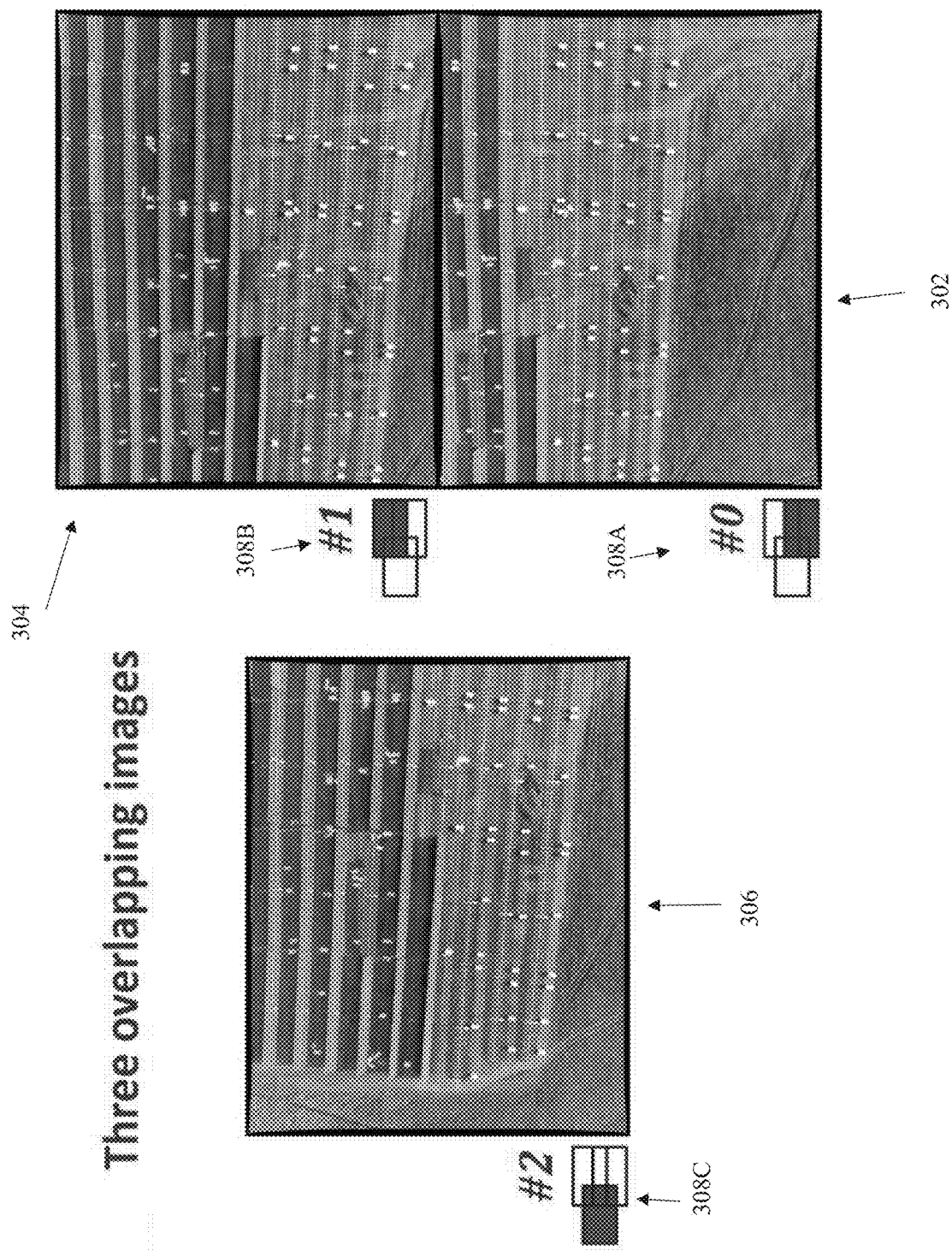
FIG. 3 depicts three exemplary overlapping images, in accordance with some embodiments of the present invention.
Figure 4:
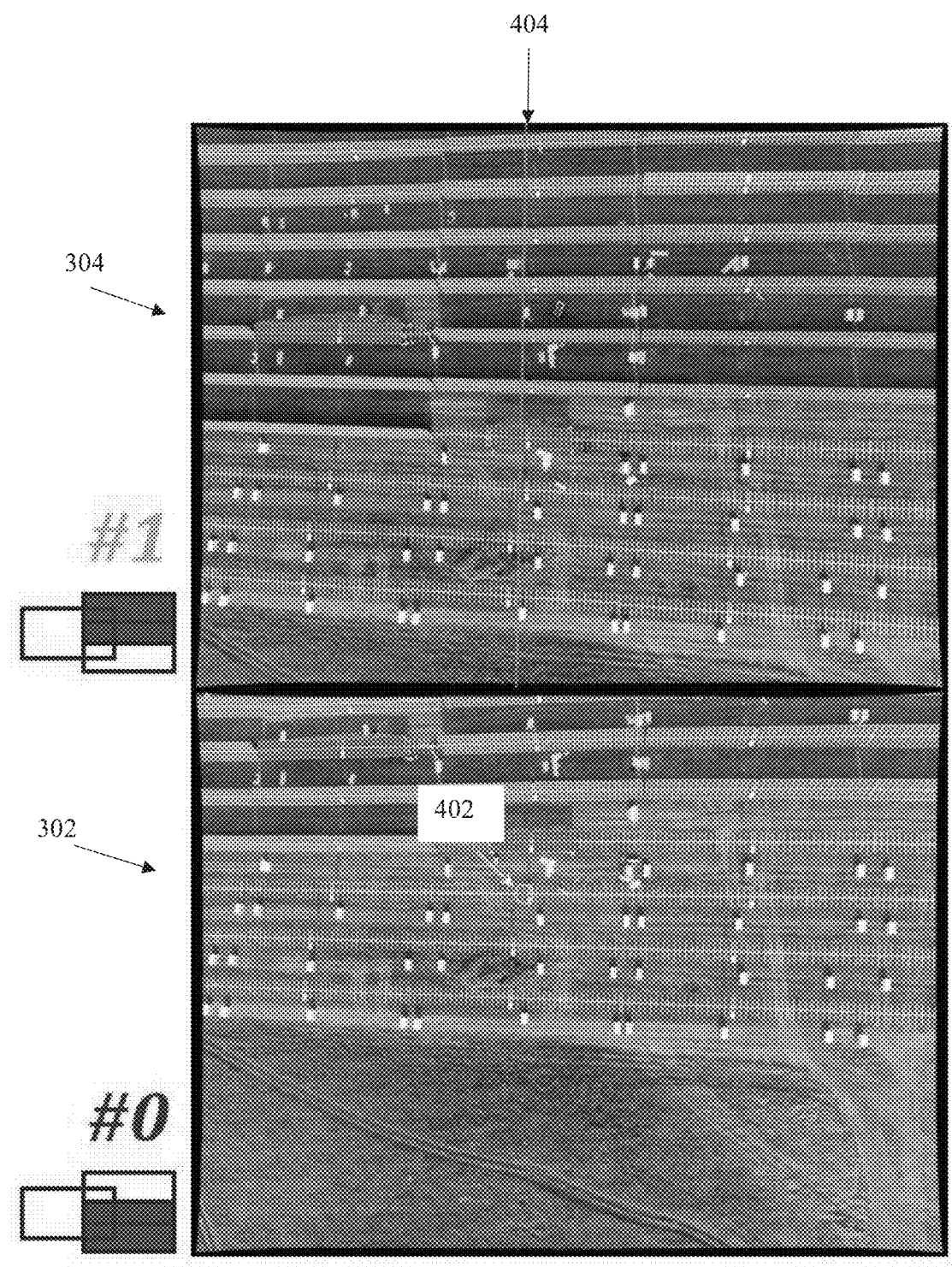
FIG. 4 is a first image depicting detection of a first object and computation of a first epipolar line, in accordance with some embodiments of the present invention.
Figure 5:
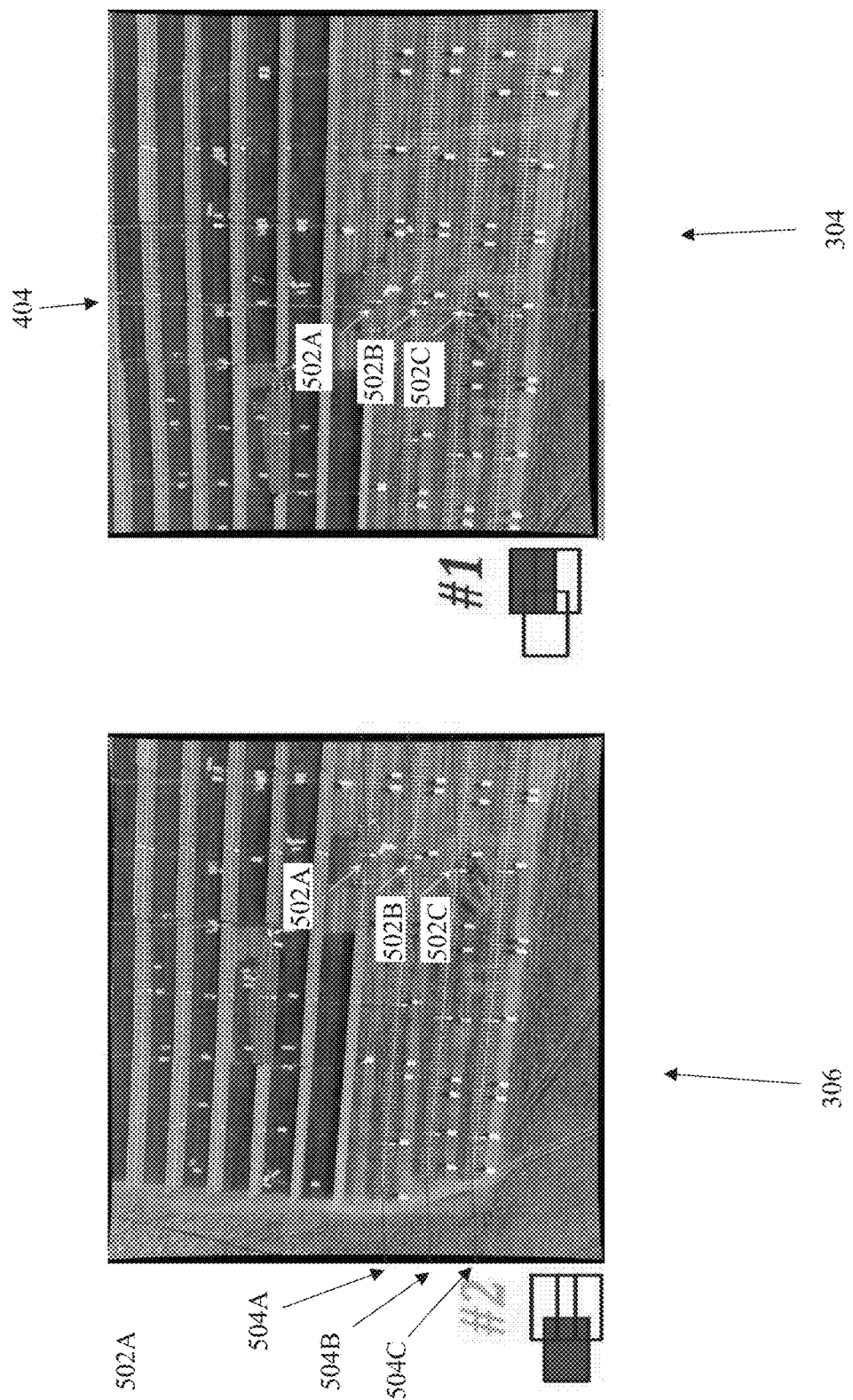
FIG. 5 is a second image depicting multiple second objects along the first epipolar line, which are projected to multiple second epipolar lines of a third image, in accordance with some embodiments of the present invention.
Figure 6:
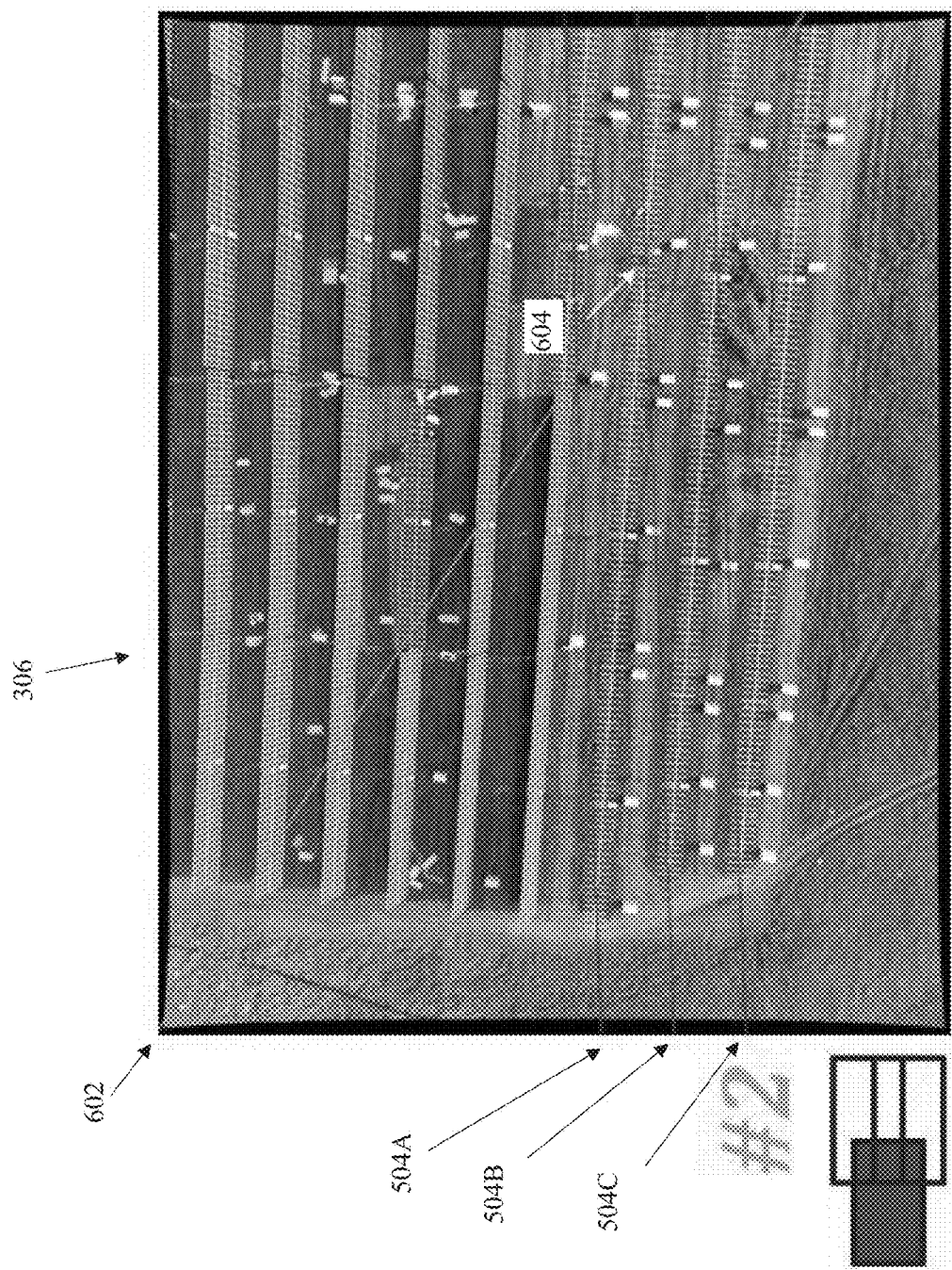
FIG. 6 is a third image depicting a projection of the first object of the first image to a third epipolar line, and a third object along an intersection of the third epipolar line and a certain second epipolar line of multiple second epipolar lines, in accordance with some embodiments of the present invention.
Figure 7:
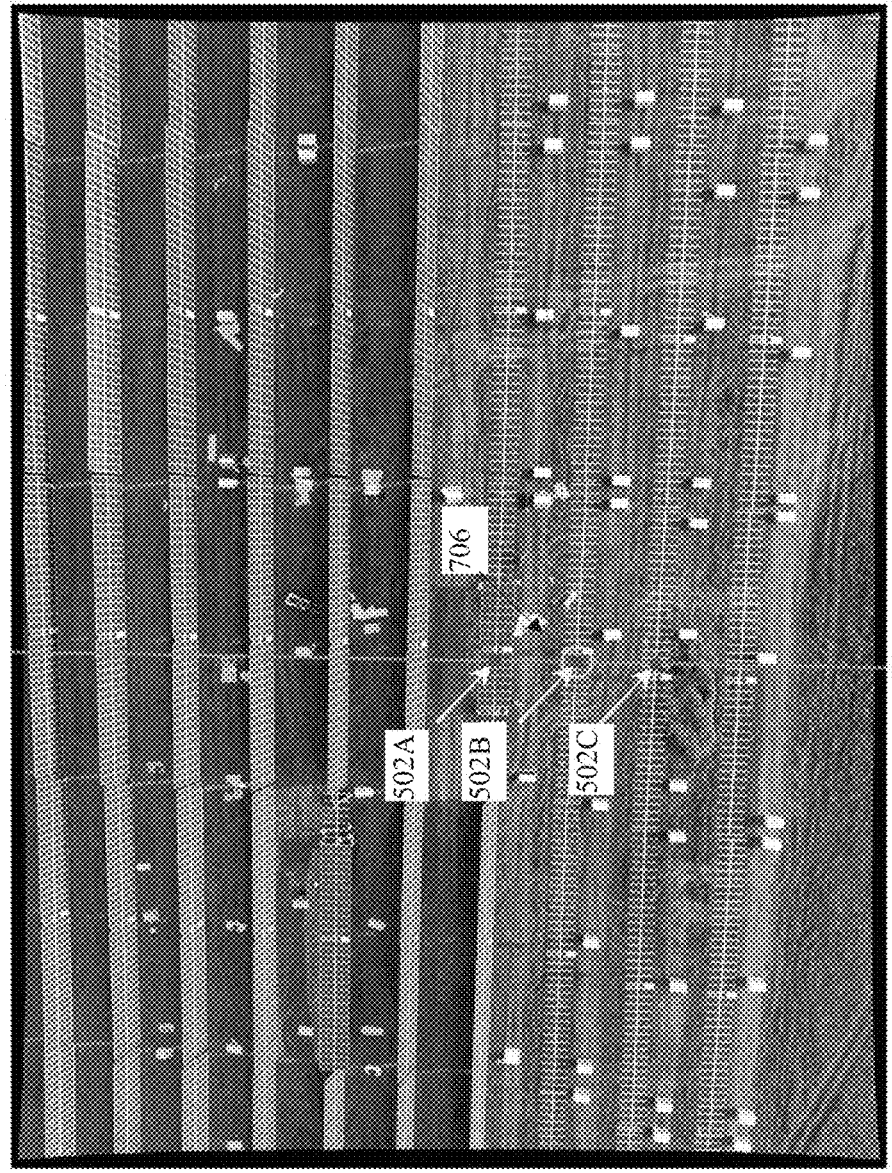
FIG. 7 is a second image depicting a fourth object corresponding to the certain second epipolar line of the third image, in accordance with some embodiments of the present invention.
Figure 7:
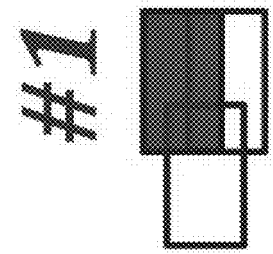
Figure 8:
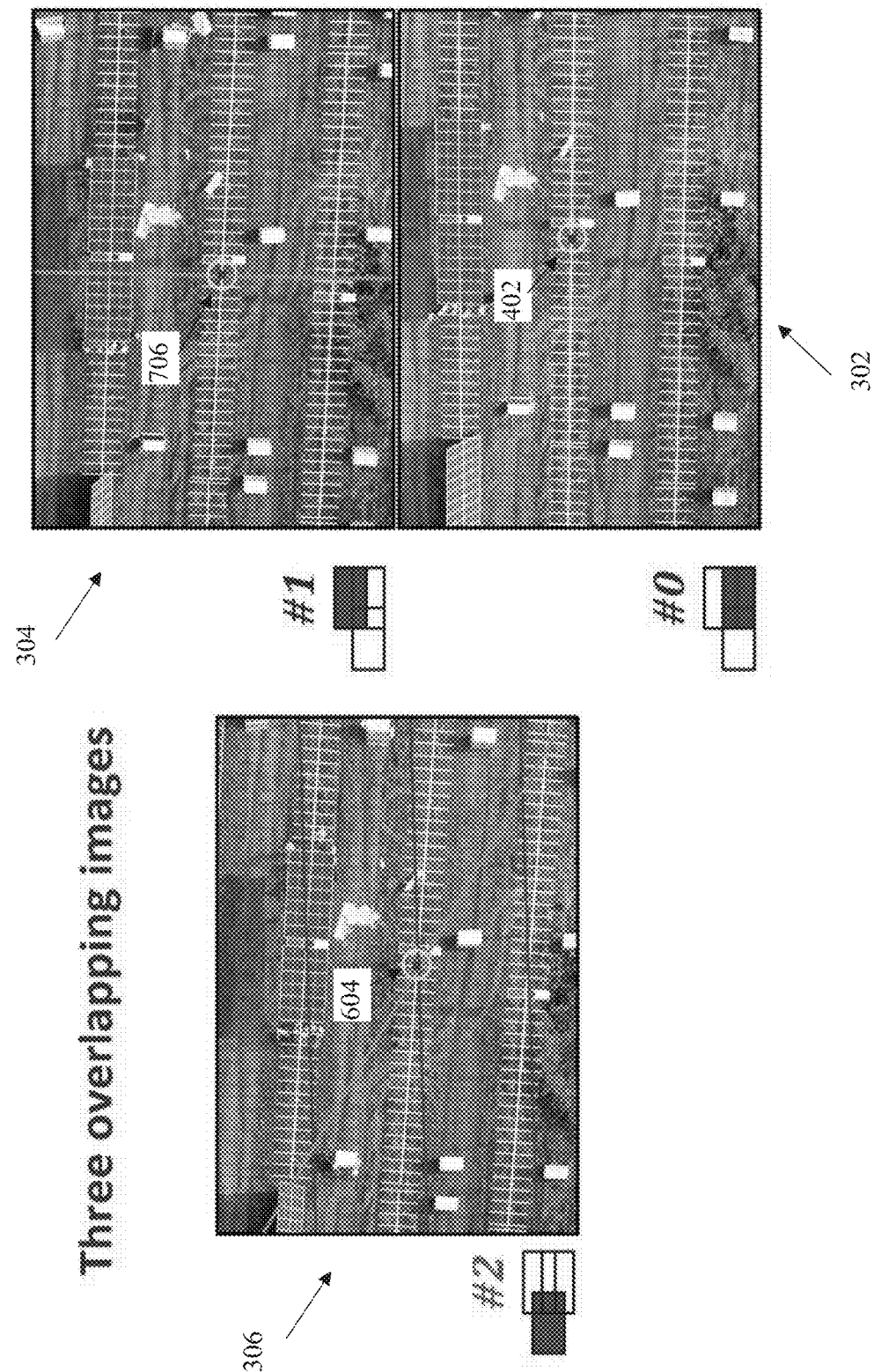
FIG. 8 is the first, second, and third images depicting the same object, in accordance with some embodiments of the present invention.
Figure 9:
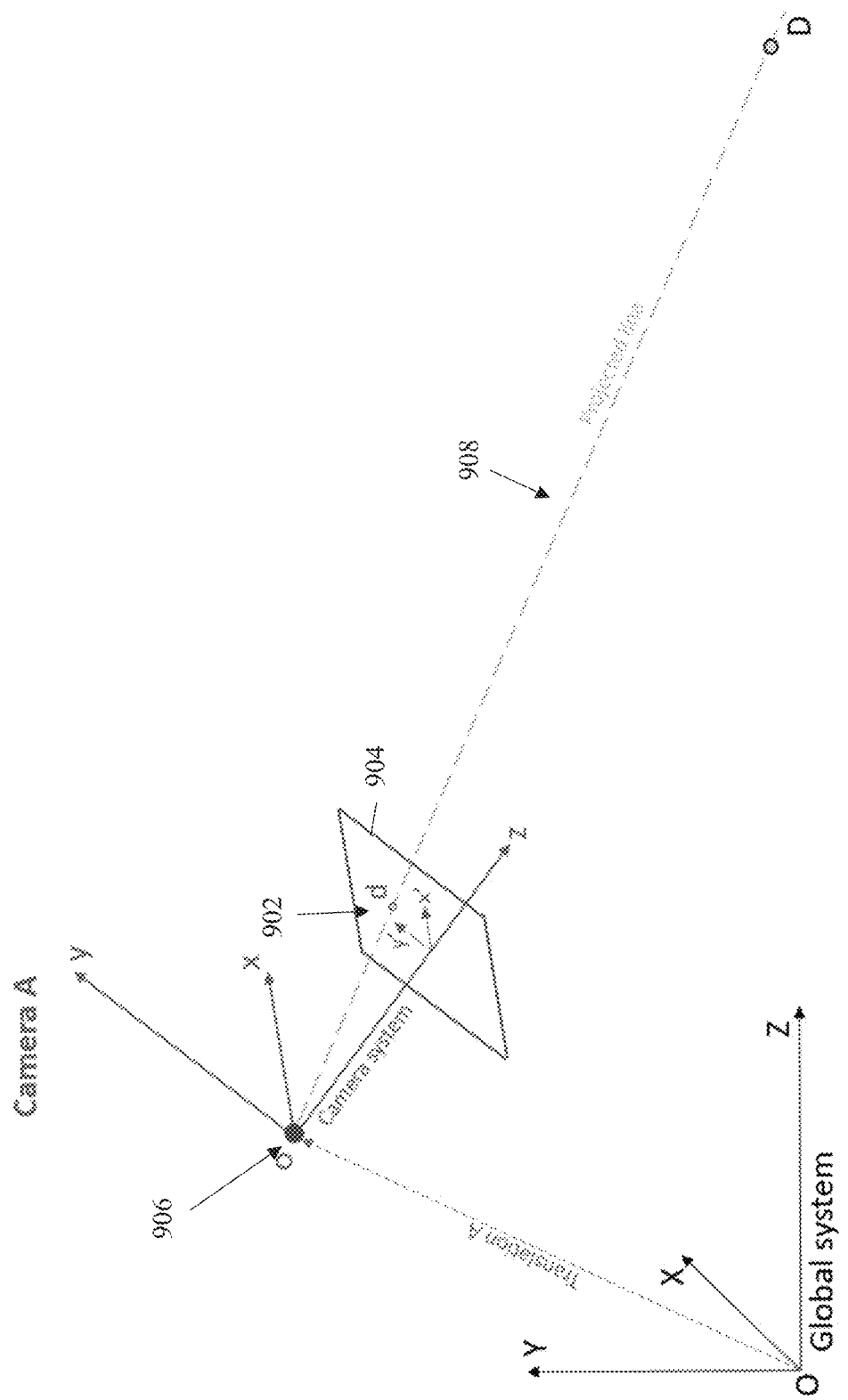
FIG. 9 is a schematic depicting an exemplary approach for projecting a point from a 2D image as a 3D line, in accordance with some embodiments of the present invention.
Figure 10:
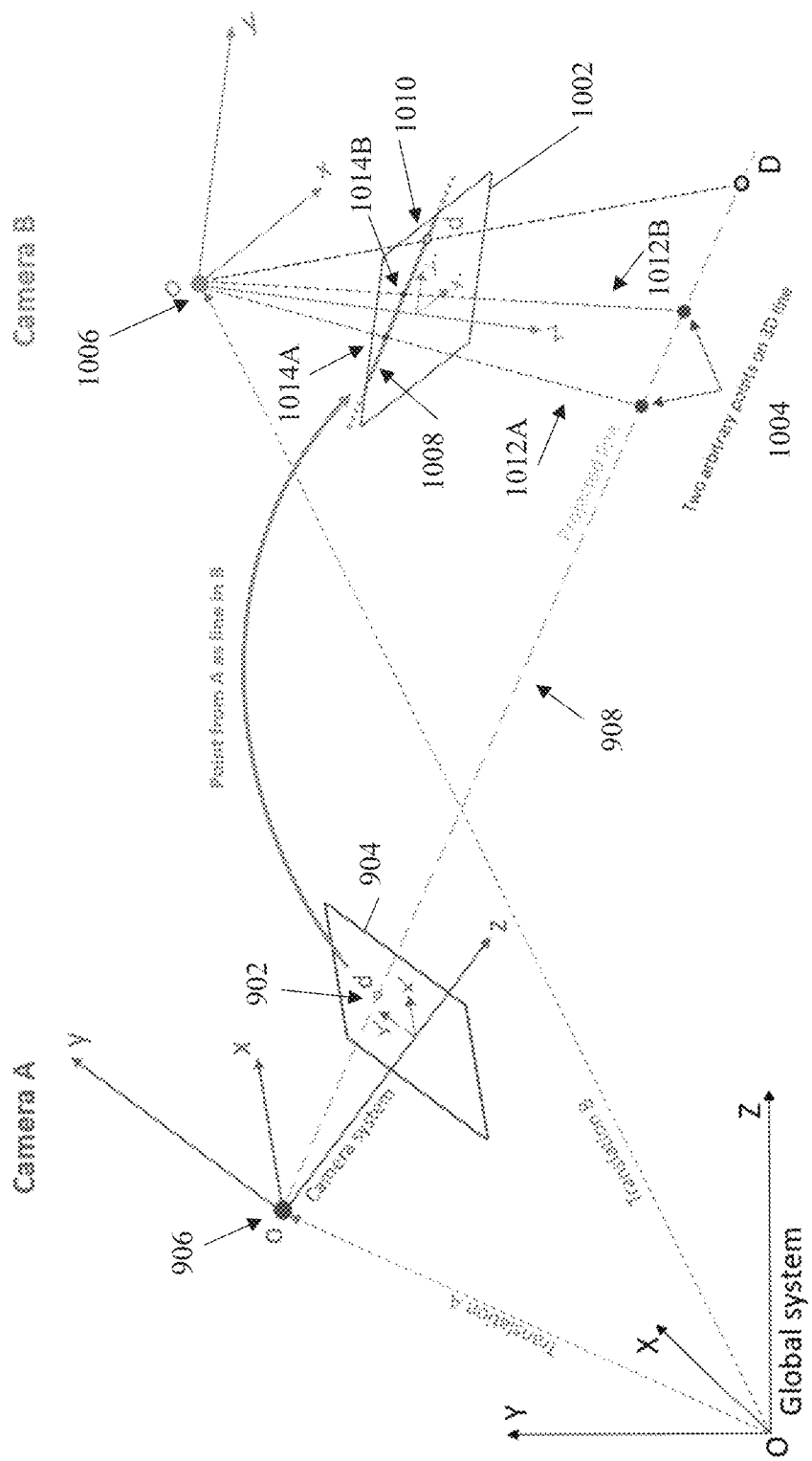
FIG. 10 is a schematic depicting an exemplary approach for projecting a 3D line into an image, in accordance with some embodiments of the present invention.

Reference is now made to FIG. 1, which is a block diagram of components of a system for matching objects depicted in different images based on triangulation, in accordance with some embodiments of the present invention. Reference is also made to FIG. 2, which is a flowchart of a method of matching objects depicted in different images based on triangulation, in accordance with some embodiments of the present invention. Reference is also made to FIG. 3, which depicts three exemplary overlapping images 302 304 and 306, in accordance with some embodiments of the present invention. Reference is now made to FIG. 4, which depicts a first object 402 depicted in first image 302 of FIG. 3 object and computation of a first epipolar line 404 of second image 304 by projection of object 402, in accordance with some embodiments of the present invention. Reference is also made to FIG. 5, which includes multiple second objects 502A-C along first epipolar line 404 of second image 304, which are projected to multiple second epipolar lines 504A-C of third image 306, in accordance with some embodiments of the present invention. Reference is also made to FIG. 6, which is the third image 602 depicting a projection of the first object 402 of the first image 302 to a third epipolar line 602, and a third object 604 along an intersection of the third epipolar line 602 and a certain second epipolar line 504B of multiple second epipolar lines 504A-C, in accordance with some embodiments of the present invention. Reference is also made to FIG. 7, which is second image 304 depicting a fourth object 706 corresponding to certain second epipolar line 504B of third image 306, in accordance with some embodiments of the present invention. Reference is also made to FIG. 8, which presents the first, second, and third images depicting the same object, in accordance with some embodiments of the present invention. Reference is also made to FIG. 9, which is a schematic depicting an exemplary approach for projecting a point from a 2D image as a 3D line, in accordance with some embodiments of the present invention. Reference is also made to FIG. 10, which is a schematic depicting an exemplary approach for projecting a 3D line into an image, in accordance with some embodiments of the present invention.

System 100 may execute the acts of the method described with reference to FIGS. 2-10, for example, by a hardware processor(s) 102 of a computing device 104 executing code 106A stored in a memory 106.

Computing device 104 receives multiple overlapping images, which may be captured by one or more imaging sensor(s) 112. Imaging sensor(s) 112 may capture each image from a different location and/or different orientation. The images captured by imaging sensor(s) 112 may be stored in an image repository 114, for example, data storage device 122 of computing device 104, a storage server 118, a data storage device, a computing cloud, virtual memory, and a hard disk. Multiple similar looking objects, optionally densely distributed, are matched across the multiple overlapping images by computing device 104, as described herein.

Computing device 104 may be implemented as, for example, a client terminal, a virtual machine, a server, a virtual server, a computing cloud, a group of connected devices, a mobile device, a desktop computer, a thin client, a kiosk, and a mobile device (e.g., a Smartphone, a Tablet computer, a laptop computer, a wearable computer, glasses computer, and a watch computer).

Multiple architectures of system 100 based on computing device 104 may be implemented. For example:

Computing device 104 executing stored code instructions 106A, may be implemented as one or more servers (e.g., network server, web server, a computing cloud, a virtual server) that provides services (e.g., one or more of the acts described with reference to FIG. 1 to one or more client terminals 108 over a network 110. For example, providing software as a service (SaaS) to the client terminal(s) 108, providing software services accessible using a software interface (e.g., application programming interface (API), software development kit (SDK)), providing an application for local download to the client terminal(s) 108, providing an add-on to a web browser running on client terminal(s) 108, and/or providing functions using a remote access session to the client terminals 108, such as through a web browser executed by client terminal 108 accessing a web sited hosted by computing device 108. In one example, images captured by imaging sensor(s) 112 are received by computing device 104. Computing device 104 performs feature matching on the multiple images, as described herein. An indication of the matched features may be fed into a machine vision process 122A (e.g., running on computing device 104 and/or on another computing device such as server(s) 118). The outcome of machine visions process 122A may be provided to respective client terminals 108 (e.g., associated with the respective imaging sensor(s) 112 that captured the images. In another example, the indication of the matched features is provided to the respective client terminals 108. Each respective client terminal 108 may feed the matched features into a locally executing machine visions process 122A.

In another example, images captured by imaging sensor(s) 112 are provided to respective client terminal(s) 108. Respective client terminal(s) 108 may access code 106A for performing feature matching and/or feeding the matched features into machine vision process 122A. For example, client terminals access code 106A running on computing device 104 via web browsers running on the client terminals, client terminals download code 106A for local execution (e.g., an app running on a smartphone), a plug-in that runs and/or accesses code 106A is installed on the web browser running on the client terminals, and/or client terminals use an API to access code 106A running on computing device 104.

Computing device 104 may be implemented as a standalone device (e.g., kiosk, client terminal, smartphone, server) that includes locally stored code instructions 106A that implement one or more of the acts described with reference to FIGS. 2-10. The locally stored instructions may be obtained from another server (e.g., 118), for example, by downloading the code over the network, and/or loading the code from a portable storage device. In such implementation, each user uses their own computing device 104 to locally perform feature matching on images captured by imaging sensor(s) 112 and/or feeding the matched features into machine vision process 122A, as described herein.

In an exemplary implementation, computing device 104 and/or client terminal 108 may be implemented, for example, as a robot, drone, autonomous vehicle, and the like. Imaging sensor(s) 112 may be installed on the computing device 104 and/or client terminal 108. For example, a drone with one or more imaging sensor(s) 112 captures multiple images. The features are matched by code 106A (e.g., locally executed by processors on the drone, and/or remotely executed by a server in wireless communication with the drone). The matched features may be fed into machine vision process 122A (e.g., locally executed by processors on the drone, and/or remotely executed by a server in wireless communication with the drone). The drone may autonomously navigate and/or perform tasks according to the outcome of machine vision process 122A.

Exemplary imaging sensor(s) 112 include: RGB (red, green, blue) sensors such as CMOS and/or CCD, short-wave infrared (SWIR), forward looking infrared (FLIR), 3D cameras, multispectral, hyperspectral, visible light frequency range, near infrared (NIR) frequency range, infrared (IR) frequency range, thermal sensor, and combinations of the aforementioned. The imaging sensor(s) 112 may be a still camera capturing still images, and/or a video camera capturing a video. Frames extracted from the video may be used at the images described herein.

Exemplary machine vision process 122A include: homography, stereoscopic vision, epipolar related search, 3d reconstruction, orthophoto creation, and the like. Machine vision process 122A may be stored on, and/or executed by processors of, for example computing device 104, client terminal(s) 108, and/or server(s) 118.

Hardware processor(s) 102 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include one or more processors (homogenous or heterogeneous), which may be arranged for parallel processing, as clusters and/or as one or more multi core processing units.

Memory 106 (also referred to herein as a program store, and/or data storage device) stores code instruction for execution by hardware processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 106 stores code 106A that implements one or more acts and/or features of the method described with reference to FIGS. 2-10.

Computing device 104 may include a data storage device 122 for storing data, for example, machine vision process (es) 122A. Data storage device 122 may be implemented as, for example, a memory, a local hard-drive, a removable storage device, an optical disk, a storage device, and/or as a remote server and/or computing cloud (e.g., accessed over network 110). It is noted that code 122A may be stored in data storage device 122, with executing portions loaded into memory 106 for execution by processor(s) 102.

Computing device 104 may receive multiple overlapping images 116 (e.g., captured by imaging sensor 112) using one or more imaging interfaces 120, for example, a wire connection (e.g., physical port), a wireless connection (e.g., antenna), a local bus, a port for connection of a data storage device, a network interface card, other physical interface implementations, and/or virtual interfaces (e.g., software interface, virtual private network (VPN) connection, application programming interface (API), software development kit (SDK)).

Computing device 104 may include data interface 124, optionally a network interface, for connecting to network 110, for example, one or more of, a network interface card, a wireless interface to connect to a wireless network, a physical interface for connecting to a cable for network connectivity, a virtual interface implemented in software, network communication software providing higher layers of network connectivity, and/or other implementations.

It is noted that imaging interface 120 and data interface 124 may exist as two independent interfaces (e.g., two network ports), as two virtual interfaces on a common physical interface (e.g., virtual networks on a common network port), and/or integrated into a single interface (e.g., network interface).

Computing device 104 may communicate using network 110 (or another communication channel, such as through a direct link (e.g., cable, wireless) and/or indirect link (e.g., via an intermediary computing device such as a server, and/or via a storage device) with one or more of:

Server(s) 118, for example, to obtain images 116, and/or obtain an updated version of code 106A.

Client terminal(s) 108, for example, when computing device 104 acts as a server providing services to multiple client terminals 108, for example, surveillance robots and/or surveillance drones.

Image repository 114 that stores images 116 captured by imaging sensor(s) 112.

Computing device 104 and/or client terminal(s) 108 includes or is in communication with a physical user interface 126 that includes a mechanism designed for a user to enter data (e.g., select images for feature matching) and/or view data (e.g., view matched features and/or view outcome of machine vision process 122A fed the matched features). Exemplary physical user interfaces 126 include, for example, one or more of, a touchscreen, a display, a keyboard, a mouse, and voice activated software using speakers and microphone.

Referring now back to FIG. 2, it is noted that the method is described with reference to three overlapping images, however, one skilled in the art may extend the method to four or more overlapping images. The three images are individually referred to herein as a first image, a second images, and a third image.

At 200, multiple overlapping images are accessed.

The first image overlaps with the second image and with the third image. The second image overlaps with the first image and with the third image. The third image overlaps with the second image and with the first image.

The multiple overlapping images may be captured with the same imaging sensor, sequentially at different positions and/or different orientations. The multiple overlapping images may be captured with multiple imaging sensors, optionally simultaneously or near simultaneously, where the multiple imaging sensors are positioned at different locations and/or at different orientations.

The multiple images depict objects that are similar looking to one another. For example, a first object in the first image looks like multiple other objects in the same first image and/or in the second image and/or in the third image. In terms of pure visual features, the first object may be incorrectly matched (e.g., using standard feature matching approaches) to any one of the multiple other objects, which are actually different physical objects. The similar looking objects may be in near proximity to each other, which may make it even more technically challenging to correctly match the same physical object. The similar looking objects may be arranged in a repeating pattern, for example, a grid, which may make it even more technically challenging to correctly match the same physical object.

Referring now back to FIG. 3, the processor(s) accesses a first image 302, a second image 304, and a third image 306, that are overlapping with one another. Images 302 304 and 306 may be obtained, for example, by one or more cameras on a drone. Legends 308A-C indicate the relative position of each image with respect to the other images, and indicate the overlap between the images. Images 302 304 and 306 depict multiple solar panel cross arms, which are very similar in appearance to one another, are densely distributed, and/or are arranged in a grid like pattern, which makes it technically challenging to correctly match one solar panel crossarm depicted in one image to the same physical solar panel crossarm depicted in the other images.

Referring now back to FIG. 2, at 202, parameters of the imaging sensor(s) that captured the multiple overlapping images are accessed (e.g., received, obtained, computed, accessed).

Exemplary parameters include the position and/or orientation of the imaging sensor(s), and/or intrinsic parameter(s) of the imaging sensors. The position and/or orientation may be defined by six degrees of freedom, three for the position and three for the rotation. These may be represented as a translation vector denoted t and a rotation matrix denoted M. Examples of intrinsic parameters include the focal length of the lens denoted f, sensor size, pixel size, image resolution, and position of principal point.

The method described with reference to FIG. 2 is based on pre-knowledge of a precise-enough epipolar line of each image, from each imaging sensor. Precision of the epipolar lines and/or identified matching objects may be obtained by creating a 3D model using the images, for example, through the process of bundle adjustment.

The exemplary parameters may be computed, refined, and/or estimated, for example, using a process of bundle adjustment.

At 204, the processor detects a first object depicted in a first image. One or more similar looking first objects may be detected, optionally simultaneously. For example, all instances of the first object depicted in the first image are detected.

The first object(s) may be detected by an image processing detector, for example, a neural network trained for detection of the first object in an image, and/or other image processing approaches such as detection using features, using patterns of illumination/color, and the like.

In the case of multiple first detected objects in the same image, features described with reference to 204-222 are iterated for each detected first object, optionally for each one of the detected first objects. The multiple iterations may be performed independently for each first object, in no particular order (e.g., randomly, in a pattern such as from top left to bottom right), in parallel and/or sequentially.

Referring now back to FIG. 4, first object 402 is detected from first image 302 (e.g., as described with reference to FIG. 3). First object 402 is selected from multiple similar looking objects that are detected in first image 302, which may be located in proximity to first object 402.

Referring now back to FIG. 2, at 206, the processor computes a projection of a first epipolar line, from the first object of the first image, to the second image.

Referring now back to FIG. 4, the processor computes a projection of a first epipolar line 404 of second image 302, from first selected object 402 of first image 302.

Referring now back to FIG. 2, at 208, the processor selects and/or identifies multiple second objects along the first epipolar line of the second image. The processor may select all second objects that fall alone and/or in close proximity to the first epipolar line. The second objects may be selected on the basis of appearing similar to the first object, for example, by a similarity process that segments objects, and computes a correlation value indicative of similarity between objects. Objects having the correlation value above a threshold may be selected. Objects that intersect the first epipolar line may be selected. Objects in close proximity to the epipolar line, for example, a certain number of pixels and/or other measure, which may indicate an error tolerance range, may be selected.

Referring now back to FIG. 5, the processor selects multiple second objects 502A-C along first epipolar line 404 of second image 304. It is noted that second objects 502A-C intersect first epipolar line 404, and/or look similar to first selected object 402 of first image 302 as shown in FIG. 4.

Referring now back to FIG. 2, at 210, the processor projects multiple second epipolar lines, from the second objects of the second image, to the third image.

Referring now back to FIG. 5, the processor projects multiple second objects 502A-C of second image 304 to multiple second epipolar lines 504A-C of third image 306. The location of multiple second objects 502A-C are shown on third image 306 as a reference.

Referring now back to FIG. 2, at 212, the processor projects a third epipolar line from the first object of the first image to the third image. The third epipolar line may be extended from the first object of the first image to the third image using the equation defining the third epipolar line, which is mapped to the first image.

Referring now back to FIG. 6, the processor projects first object 402 of first image 302 to a third epipolar line 602 of third image 306.

Referring now back to FIG. 2, at 214, the processor identifies on the third image, a third object along an intersection of the third epipolar line and a certain second epipolar line of the multiple second epipolar lines. The third object matches the first object of the first image, i.e., the third object of the third image and the first object of the first image both depict the same physical object.

Referring now back to FIG. 6, the processor identifies on third image 306, a third object 604 along an intersection of third epipolar line 602 and a certain second epipolar line 504B of the multiple second epipolar lines 504A-C. Third object 604 of third image 306 matches first object 402 of first image 302, depicting the same physical object.

Referring now back to 214 of FIG. 2, in response to processor identifying a single third object on the third image, the method continues to 216. Alternatively, in some cases, there may be multiple identified third objects, for example, multiple intersections between the third epipolar line and the second epipolar lines. In such scenario, the method may proceed to 215 alternatively to 216.

At 215, the processor may access another image, and iterate features described with reference to 206-214 using the new image. At each iteration, another image may be accessed, until a single third object is identified on the third image, at which point the method proceeds to 216. I.e., during a first iteration, a fourth image is added, during a second iteration a fifth image is added, etc. . . . . .

Features 206-214 are adapted during the iterations, using the new image (e.g., fourth image during the first iteration), as follows: At 206, the first image and the fourth image are used, rather than the first image and second image as previously. At 208, the fourth image and the first image are used, rather than the second image and the first image as previously. At 210, the fourth image and the third image are used, rather than the second image and the third image as previously. The third image is then evaluated to determine if there is a single matching third object. If there is single matching third object, then the method proceeds to 216, where at 218 the same object is identified (e.g., tagged) on all four images. When there is no single third object, another iteration using a fifth image is performed. The pattern is continued, using the second image, the fourth image, and the fifth image.

At 216, the processor maps the certain second epipolar line of the third image, to a corresponding fourth object on the second image. The mapping of the certain second line to the corresponding fourth object may be computed, for example, using the fundamental matrix computed herein. The mapping from the certain second line to the corresponding fourth object may be a reversal of the process of projecting a point in one image to an epipolar line in another images, as described herein. The fourth object depicted in the second image is the same as the first object depicted in the first image and the third object depicted in the third image. The fourth object lies along the first epipolar line depicted in the second image. The fourth object is one of the multiple second objects previously identified along the first epipolar line of the second image.

Optionally, the representation (e.g., location) of a point in one image and representation (e.g., equation) of the corresponding mapped epipolar line of the point in another image may be stored in tandem, for example, to allow fast references by look-up.

Referring now back to FIG. 6 and FIG. 7, the processor traces maps certain second epipolar line 504B of third image 306 as in FIG. 6, to a corresponding fourth object 706, which lies along first epipolar line 404 depicted in second image 304. Fourth object 706 may be obtained by mapping certain second epipolar line 504B of third image 306 back to a point in second image 304, for example, using the fundamental matrix which is calculated as described herein. Fourth object 706 depicted in second image 304 is the same as first object 402 depicted in first image 302 (e.g., as shown in FIG. 4) and the same as third object 604 depicted in third image 306 (e.g., as shown in FIG. 6). The processor marks the fourth object along the first epipolar line depicted in the second image. Fourth object 706 is one of the multiple second objects (i.e., object 502B of 502A-C) previously identified along first epipolar line 404 of second image 304. In this particular example, fourth object 706 is the same as second object 502B of second image 304.

Referring now back to FIG. 2, at 218, the processor generates an indication of one or more of the following objects depicted in images, as being matches of the same object (i.e., the same physical object in the real world): the first object depicted in first image, the fourth object depicted in the second image, and the third object depicted in the third image.

The indication may be, for example, a unique marking encompassing the first object, the fourth object, and the third object (e.g., color coded square), a metadata tag, coordinates of pixels denoting the respective object of each respective image, a mapping dataset (e.g., matrix, table, pointers) that map between representations of the same objects of the different images, and lines drawn from one object of one image to the same object in another image (e.g., the lines could be new lines, or the computed traced epipolar lines).

Referring now back to FIG. 8, images indicating the same object are presented. First object 402 is depicted in first image 302, fourth object 706 is depicted in second image 304, and third object 604 is depicted in third image 306, which all represent the same physical object in the real world.

Referring now back to FIG. 2, at 220, the indication of the matching objects (e.g., matching features) may be provided, for example, to a local computing device, to a remote computing device, for storage on a data storage device, and/or to an executing process.

At 222, the indication of the matching features may be fed to an image processing process that processes images based on matching features identified in multiple images. The image processing process may perform, for example, homography, stereoscopic vision, epipolar related search, 3D reconstruction, and orthophoto creation.

At 224, one or more actions may be triggered based on the output of the image processing process. For example, real-time 3D images may be generated, an autonomous vehicle may be navigated, and the like.

At 226, one or more features described with reference to 202-224 may be iterated. The iterations may be performed, for example, for each object of interest depicted in one or more of the overlapping images, for matching multiple objects across the multiple overlapping images. The iterations may be performed on the same images and/or on another set of images, for example, obtained in near real time as the imaging sensor(s) change orientation and/or position, and/or for real time monitoring of objects and/or real time control (e.g., of a navigation vehicle). The iterations may be performed, for example, sequentially (e.g., for one object at a time) and/or in parallel (e.g., parallel processing for matching multiple objects).

The method described with reference to FIG. 2 is based on projecting a point from one image as an epipolar line on another image. Epipolar lines may be calculated using different approaches. An exemplary approach is by calculating a fundamental matrix, as described below.

Given two imaging sensors (e.g., cameras) with known intrinsic parameters and known relative orientation. A Fundamental matrix may be calculated such that a point found in the image of one camera is defined as a line in the other camera image. The relation formed by the Fundamental matrix is described in Equation (1).

$$x'^T_i F x_i = 0 \quad (1)$$

where $x_i$ and $x'_i$ are given in homogeneous coordinates and represent the projections of the same spatial point (detection denoted i), onto the image planes of the cameras denoted C and C' respectively. In case only $x'_i$ is known, Equation (1) reduces to an epipolar line equation in the reference frame of camera C:

$$x'^T_i F x_i = (a,b,c)*(x,y,1) = ax + by + c = 0 \quad (2)$$

Where x and y are the image coordinates of camera C, and (a,b,c) is the result of $x'^T_i F$.

An exemplary approach for calculation of epipolar lines is now described:

The approach for computing epipolar lines may be split into two basic steps:

a) Projecting a point from a 2D image as a 3D line.
b) Projecting the 3D line into another 2D image.

Exemplary approaches for each of these steps is now described:

Attention is now referred back to FIG. 9, which is a schematic depicting an exemplary approach for projecting a point from a 2D image as a 3D line, a point of interest, denoted as a detection d 902, is identified on a 2D image 904. Given the spatial orientation of the camera and its intrinsic parameters (focal length, sensor size, etc.), the detection may be assigned with 3D coordinates. The 3D position of the detection (d) 902 together with the 3D position of the camera, denoted o 906, define a line in 3D, denoted a projected 3D line 908.

The 3D position of the detection 902 is given by d=Oo+od, where Oo is defined by the pre-estimated camera's position, and od can be derived from the camera's intrinsic parameters.

Given points o 906 (defined by vector Oo) and d 902 (defined by vector Od) the 3D line 908 may be defined as Equation (1):

$$(x,y,z) = (x_o, y_o, z_o) + \alpha(a,b,c) \quad (1)$$

Where ($x_o$, $y_o$, $z_o$) denote the spatial coordinates of camera's position 906 (o) and a, b, c indicate the direction of the line 908 and may be defined as: $a=x_p-x_o$; $b=y_p-y_o$; $c=z_p-z_o$.

Attention is now referred back to FIG. 10, which is a schematic depicting an exemplary approach for projecting a 3D 908 line into an image 1002. 3D line 908 is computed as described with reference to FIG. 9.

To project the obtained 3D line 908, two arbitrary points that satisfy Eq. (1) and thus are lying on the 3D 908 line are chosen (in principal points o 906 and d 902 can also be chosen). These points are projected onto another camera 1006. The points 1004 are transformed into image coordinates and an epipolar line 1008 may be defined on the image plane 1002. It is noted that the obtained epipolar line 1008 also passes through the image 1002 of the detection of interest 1010 which represents the same physical object as detection 902 in image 904.

To project the points 1004 onto the image 1002, a line equation 1012A-B is defined for each of the points 1004 according to Equation (1). The line 1012A-B is defined by the considered point 1004 and the center of the camera 1006. The point's 1004 projection onto the image 1002 is the intersection 1014A-B of the lines 1012A-B and the image plane 1002 (defined by the intrinsic parameters of the camera). Once both points 1004 are projected, they may be transformed to the image coordinate system, an epipolar line equation 1008 may be defined.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant images will be developed and the scope of the term image is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of matching features depicted in a plurality of images, comprising:
   detecting a first object depicted in a first image, wherein said first image depicting a plurality of objects having matching visual features with said first object;
   projecting a first epipolar line, from the first object of the first image, to a second image, wherein said second image depicting at least some of said plurality of objects having matching visual features with said first object;
   selecting a plurality of second objects along the first epipolar line of the second image;
   projecting a plurality of second epipolar lines, from the plurality of second objects of the second image, to a third image, wherein said third image depicting at least some of said plurality of objects having matching visual features with said first object;
   projecting a third epipolar line from the first object of the first image to the third image;
   identifying on the third image, a third object along an intersection of the third epipolar line and a certain second epipolar line of the plurality of second epipolar lines; and
   generating an indication of the first object depicted in the first image and the third object depicted in the third image as being a same physical object out of the plurality of objects having matching visual features with said first object.

2. The computer implemented method of claim 1, in response to identifying a plurality of third objects on the third image, further comprising:
   obtaining a fourth image of the plurality of images,
   projecting a first epipolar line, from the first object of the first image, to the fourth image;
   selecting a plurality of second objects along the first epipolar line of the fourth image;
   projecting a plurality of second epipolar lines, from the plurality of second objects of the fourth image, to the third image;
   wherein the third object is identified on the third image, and the indication is generated for the first, second, third, and fourth images.

3. The computer implemented method of claim 2, in response to identifying a plurality of third objects on the third image, further comprising iterating the obtaining, the projecting the first epipolar line, the selecting, and the projecting the plurality of second epipolar lines, using sequentially obtained new images until a single third object is identified.

4. The computer implemented method of claim 1, wherein the first image overlaps the second image and the third image, the second image overlaps the first image and the third image, and the third image overlaps the first image and the second image.

5. The computer implemented method of claim 1, further comprising mapping the certain second epipolar line of the third image, to a corresponding fourth object of the second image,
   wherein the fourth object depicted in the second image is the same as the first object depicted in the first image and the third object depicted in the third image.

6. The computer implemented method of claim 5, wherein generating the indication further comprises generating the indication of the fourth object depicted in the second image as the same physical object as the first object depicted in the first image and the third object depicted in the third image.

7. The computer implemented method of claim 5, wherein the fourth object lies along the first epipolar line depicted in the second image.

8. The computer implemented method of claim 5, wherein the fourth object is one of the plurality of second objects along the first epipolar line of the second image.

9. The computer implemented method of claim 1, further comprising feeding the indication of the first object depicted in first image and the third object depicted in the third image to an image processing process that processes images based on matching features identified in a plurality of images.

10. The computer implemented method of claim 9, wherein the image processing process is selected from a group comprising: homography, stereoscopic vision, epipolar related search, 3D reconstruction, and orthophoto creation.

11. The computer implemented method of claim 1, wherein the plurality of objects that have matching visual features are positioned in at least one of: in near proximity to each other, and arranged in a repeating pattern.

12. The computer implemented method of claim 1, further comprising accessing parameters of at least one imaging sensor that captured the plurality of images, wherein the epipolar lines are computed according to the parameters, wherein the parameters include at least one of: position of the at least one imaging sensor, orientation of the at least one imaging sensor, and intrinsic parameters of the at least one imaging sensor.

13. The computer implemented method of claim 12, wherein the parameters are at least one of computed and refined using a bundle adjustment process.

14. The computer implemented method of claim 1, wherein detecting the first object comprises detecting a plurality of first objects depicted in the first image, wherein the projecting the first epipolar line, the selecting the plurality of second objects, the projecting the plurality of second epipolar lines, the projecting the third epipolar line, the identifying on the third image, and the generating the indication, are iterated for each one of the plurality of first objects.

15. A system for matching features depicted in a plurality of images, comprising:
   at least one processor executing a code for:
      detecting a first object depicted in a first image, wherein said first image depicting a plurality of objects having matching visual features with said first object;
      projecting a first epipolar line, from the first object of the first image, to a second image, wherein said second image depicting at least some of said plurality of objects having matching visual features with said first object;
      selecting a plurality of second objects along the first epipolar line of the second image;
      projecting a plurality of second epipolar lines, from the plurality of second objects of the second image, to a third image, wherein said third image depicting at least some of said plurality of objects having matching visual features with said first object;
      projecting a third epipolar line from the first object of the first image to the third image;
      identifying on the third image, a third object along an intersection of the third epipolar line and a certain second epipolar line of the plurality of second epipolar lines; and
   generating an indication of the first object depicted in the first image and the third object depicted in the third image as being a same physical object out of the plurality of objects having matching visual features with said first object.

16. A non-transitory medium storing program instructions for matching features depicted in a plurality of images, which, when executed by at least one processor, cause the at least one processor to:
   detect a first object depicted in a first image, wherein said first image depicting a plurality of objects having matching visual features with said first object;
   project a first epipolar line, from the first object of the first image, to a second image, wherein said second image depicting at least some of said plurality of objects having matching visual features with said first object;
   select a plurality of second objects along the first epipolar line of the second image;
   project a plurality of second epipolar lines, from the plurality of second objects of the second image, to a third image, wherein said third image depicting at least some of said plurality of objects having matching visual features with said first object;
   project a third epipolar line from the first object of the first image to the third image;
   identify on the third image, a third object along an intersection of the third epipolar line and a certain second epipolar line of the plurality of second epipolar lines; and
   generate an indication of the first object depicted in the first image and the third object depicted in the third image as being a same physical object out of the plurality of objects having matching visual features with said first object.

* * * * *